United States Patent
Takahashi et al.

(10) Patent No.: US 10,352,379 B2
(45) Date of Patent: Jul. 16, 2019

(54) INPUT DEVICE

(71) Applicant: Alps Alpine Co., Ltd., Tokyo (JP)

(72) Inventors: Kazunari Takahashi, Miyagi-ken (JP); Atsushi Goto, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 26 days.

(21) Appl. No.: 15/672,094

(22) Filed: Aug. 8, 2017

(65) Prior Publication Data
US 2018/0080511 A1 Mar. 22, 2018

(30) Foreign Application Priority Data

Sep. 16, 2016 (JP) ................ 2016-182177

(51) Int. Cl.
| | | |
|---|---|---|
| *F16F 15/16* | (2006.01) | |
| *F16F 13/26* | (2006.01) | |
| *F16F 15/18* | (2006.01) | |
| *F16D 57/00* | (2006.01) | |
| *H02K 11/21* | (2016.01) | |
| *H02K 7/102* | (2006.01) | |
| *H02K 26/00* | (2006.01) | |
| *H02K 49/06* | (2006.01) | |
| *B62D 5/00* | (2006.01) | |

(52) U.S. Cl.
CPC ........... *F16D 57/002* (2013.01); *B62D 5/006* (2013.01); *H02K 7/1023* (2013.01); *H02K 11/21* (2016.01); *H02K 26/00* (2013.01); *H02K 49/06* (2013.01)

(58) Field of Classification Search
CPC ................ G06F 3/014; F16F 9/125
USPC ........ 318/3, 742, 136, 400.15, 432, 400.34, 318/732
See application file for complete search history.

(56) References Cited

U.S. PATENT DOCUMENTS 3,768,714 A * 10/1973 Applequist .......... G03B 27/465
192/12 D
2003/0030407 A1 2/2003 Maeda

FOREIGN PATENT DOCUMENTS

| JP | 2003-50639 | 2/2003 |
| JP | 2005-507061 | 3/2005 |
| WO | 03/036120 | 5/2003 |

* cited by examiner

*Primary Examiner* — Bickey Dhakal
*Assistant Examiner* — Charles S Laughlin
(74) *Attorney, Agent, or Firm* — Beyer Law Group LLP (57) ABSTRACT

A rotating body is rotatably supported on a holding section. The holding section includes a rotation detection unit, a torque-applying unit, and a brake-applying unit. The torque-applying unit includes an A-phase torque-applying coil and a B-phase torque-applying coil, and a resistance torque and a pull-in torque applied to a rotor (magnet) are caused to vary as a result of controlling supply of current to each of the coils. In addition, a braking force can be controlled by supplying current to a brake-applying coil included in the brake-applying unit.

12 Claims, 10 Drawing Sheets

INPUT DEVICE

CLAIM OF PRIORITY

This application claims benefit of Japanese Patent Application No. 2016-182177 filed on Sep. 16, 2016, which is hereby incorporated by reference.

BACKGROUND OF THE INVENTION

1. Field of the Invention

The present invention relates to an input device capable of generating, when an operating unit is rotated, a resistance torque in a direction opposite to an operating direction and a pull-in torque in the operating direction.

2. Description of the Related Art

Japanese Unexamined Patent Application Publication No. 2005-507061 describes a brake including a magnetic-field responsive material. In the brake, a shaft is rotatably supported on a housing, and a rotor that rotates together with the shaft is provided in a first chamber of the housing. The magnetic-field responsive material and a magnetic-field generator are provided in the first chamber. The magnetic-field responsive material changes its fluidity depending on the intensity of a magnetic field. When no magnetic field is generated by the magnetic-field generator, the viscosity or shearing flow resistance of the magnetic-field responsive material decreases, and the shaft and the rotor may easily rotate. When a magnetic field is generated by the magnetic-field generator, the viscosity or shear flow resistance of the magnetic-field responsive material increases, and rotation of the shaft and the rotor is suppressed.

Japanese Unexamined Patent Application Publication No. 2003-50639 describes a manual input device. The manual input device includes an operating member, a carrier shaft that rotates together with the operating member, and an encoder provided on an output shaft of a motor. A carrier is fixed to the carrier shaft, and a plurality of planet gears are rotatably supported on the carrier. A sun gear is fixed to the output shaft of the motor, and the planet gears are engaged with peripheral portions of the sun gear. When the operating member is operated by hand so as to rotate and cause the encoder to operate, a rotational force in an operating direction or in a direction opposite to the operating direction is applied to the carrier shaft by the motor, and as a result, sensations of resistance and acceleration can be provided to a hand operating the operating member.

Although the brake described in Japanese Unexamined Patent Application Publication No. 2005-507061 can apply a braking force to the rotor through the action of the magnetic-field responsive material, the brake cannot apply a rotational force to the rotor, and thus, it is difficult to provide sensations of various operations to an operator.

The manual input device described in Japanese Unexamined Patent Application Publication No. 2003-50639 can provide sensations of resistance and acceleration to the hand operating the operating member by applying the power of the motor to the carrier shaft. However, in order to appropriately provide such sensations of resistance and acceleration to the hand, control of the motor becomes complex, and undesirable vibration may sometimes be generated by switching the direction of rotation of the motor. In order to cause the operating member not to move while being in a non-operating state, it is necessary to energize the motor even during the period when the manual input device is not in operation, which in turn results in an increase in power consumption.

SUMMARY OF THE INVENTION

The present invention provides an input device capable of stably providing appropriate sensations of resistance and retraction to a rotating body.

An input device according to an aspect of the present invention includes a holding section, a rotating body rotatably supported on the holding section, a rotation detection unit configured to detect rotation of the rotating body, a brake-applying unit configured to apply a braking force to the rotating body, a torque-applying unit configured to apply a torque to the rotating body, and a control unit configured to control current supplied to a brake-applying coil and current supplied to at least two torque-applying coils. The brake-applying unit includes a rotary plate provided to the rotating body, a magneto rheological fluid provided in a gap between the holding section and the rotary plate, and the brake-applying coil configured to provide a magnetic field to the magneto rheological fluid. The torque-applying unit includes the at least two torque-applying coils configured to apply a rotation torque to the rotating body.

The input device according to the aspect of the present invention may be configured such that, in the torque-applying unit, one of the rotating body and the holding section includes a magnet, and another one of the rotating body and the holding section includes the at least two torque-applying coils to which control currents having phases differing from each other are respectively supplied and that the rotation torque is applied to the rotating body by a magnetic field induced by the torque-applying coils.

In the input device having the above-described configuration, the control unit may include a division-angle setting unit configured to divide one rotation of the rotating body into a plurality of division angles, a torque setting unit configured to set, by controlling current supplied to the torque-applying coils, the rotation torque applied to the rotating body in each of the division angles, and a brake setting unit configured to apply, by controlling current supplied to the brake-applying coil, the braking force to the rotary plate at a boundary between the division angles.

In the input device according to the aspect of the present invention, as a result of controlling the current supplied to the torque-applying coils, a resistance torque in a direction opposite to a direction of a force causing the rotating body to rotate and a pull-in torque in the direction of the force causing the rotating body to rotate may be applied to the rotating body in each of the division angles.

In addition, the control unit may be capable of changing a magnitude of the resistance torque at each rotation angle of the rotating body and a magnitude of the pull-in torque at each rotation angle of the rotating body.

Furthermore, the division-angle setting unit may be capable of changing the division number of one rotation of the rotating body.

In the input device according to the aspect of the present invention, in the torque-applying unit, the division angles in one rotation of the rotating body may each be set to be a fixed angle.

In the input device having the above-described configuration, the torque-applying unit may include a yoke facing the rotating body. Each of the rotating body and the yoke includes facing portions that are formed at a plurality of positions in such a manner as to protrude and to be spaced apart from one another in a rotation direction of the rotating body. The torque-applying coils configured to magnetize one of the yoke and the rotating body may be provided.

In the input device according to the aspect of the present invention, it is preferable that supply of current to each of the torque-applying coils be stopped when the braking force is applied to the rotary plate at the boundary between the division angles.

The input device according to the aspect of the present invention includes the brake-applying unit that uses a magneto rheological fluid and a torque-applying unit that generates a rotation torque by using a magnetic field such that the input device is capable of providing appropriate sensations of resistance and retraction to a hand operating an operating unit. In addition, by applying the torque and the braking force to the rotating body, supply of current to the torque-applying unit can be easily controlled, and vibration of the rotating body to which the torque is applied can be suppressed.

Furthermore, by stopping the operation of the torque-applying unit when applying the braking force by the brake-applying unit, a reduction in power consumption can be achieved.

DESCRIPTION OF THE PREFERRED EMBODIMENTS

Figure 1:
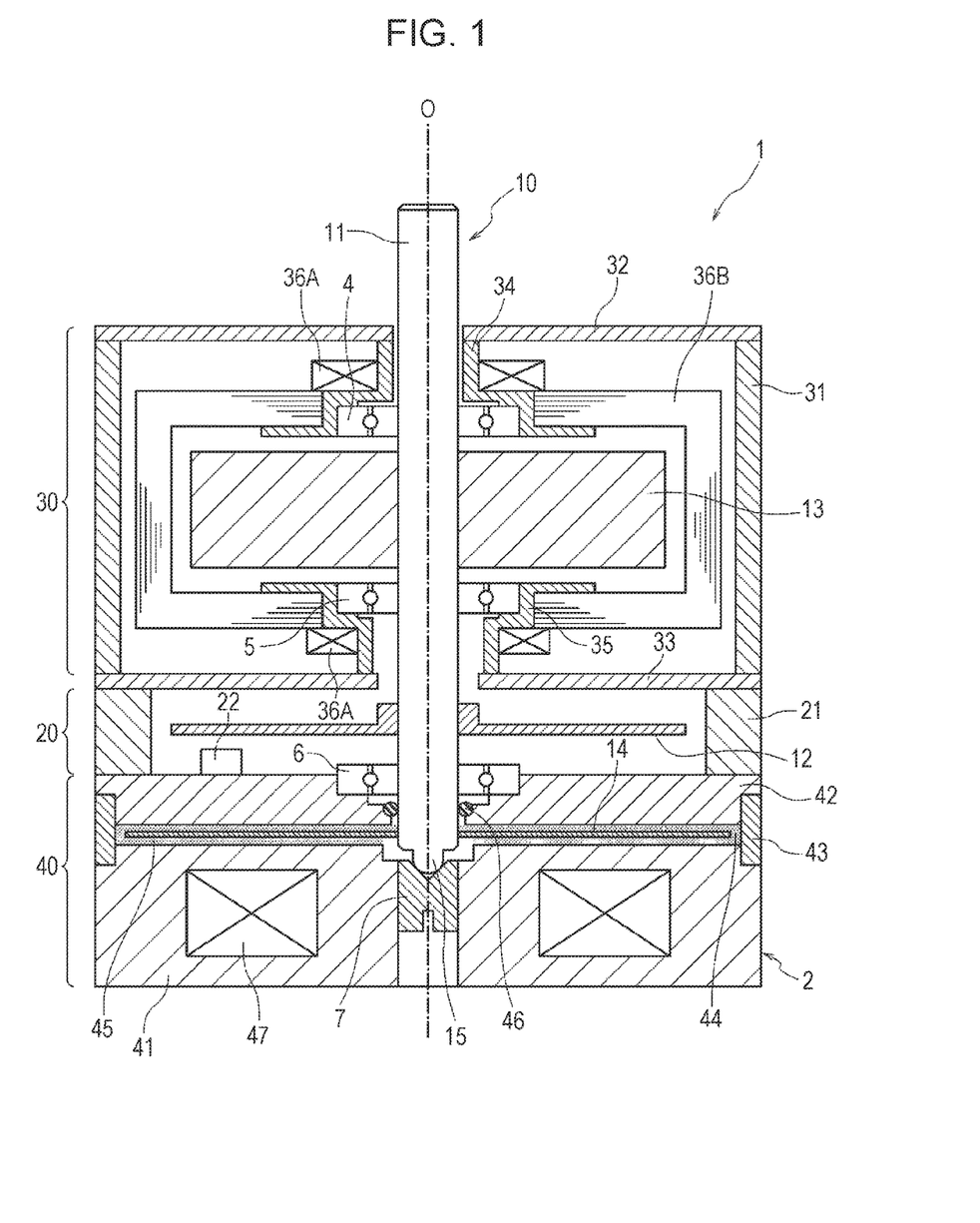
FIG. 1 is a sectional view illustrating the overall structure of an input device according to a first embodiment of the present invention.
Figure 2:
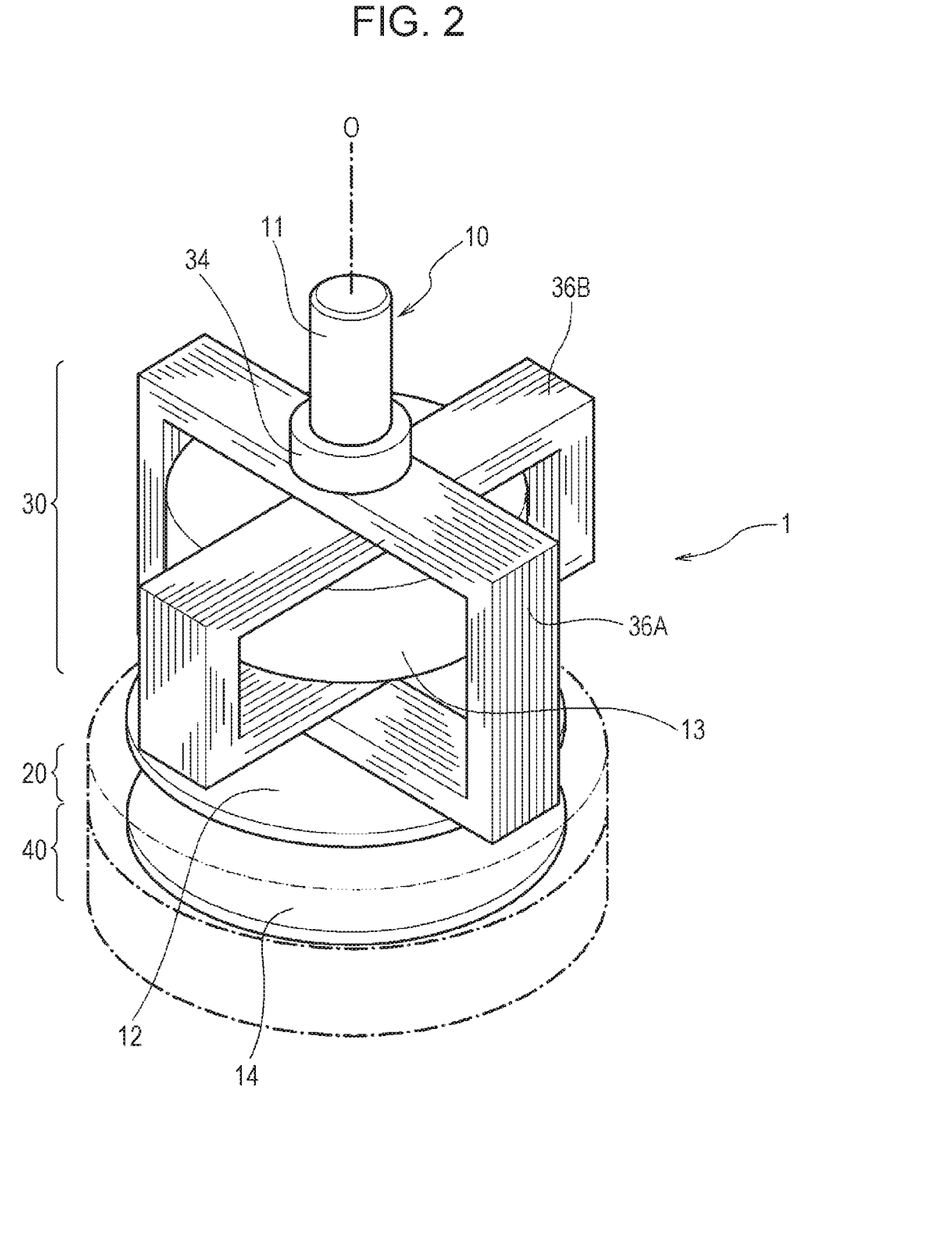
FIG. 2 is a perspective view illustrating a principal portion of the input device according to the first embodiment.
Figure 3:
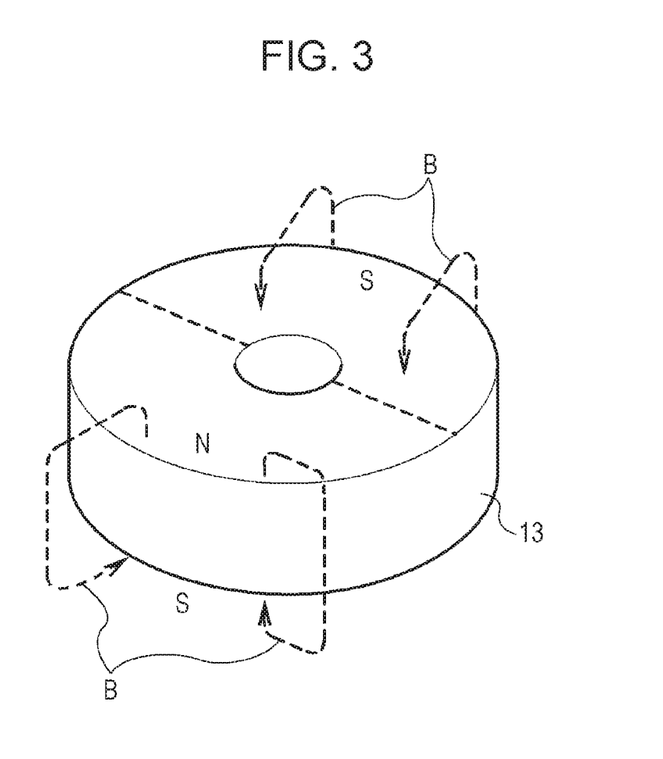
FIG. 3 is a perspective view illustrating a rotor (magnet) included in a rotating body of the input device according to the first embodiment.

The structure of an input device 1 according to a first embodiment of the present invention is illustrated in FIG. 1 to FIG. 3.

As illustrated in FIG. 1, the input device 1 includes a holding section 2 and a rotating body 10 rotatably supported on the holding section 2. The rotating body 10 includes an operating shaft 11. FIG. 1 illustrates a rotation center line O of the operating shaft 11. In the rotating body 10, a detection plate 12, a rotor (magnet) 13, and a rotary plate 14 are fixed to the operating shaft 11.

A plurality of radial bearings 4, 5, and 6 are disposed in the holding section 2, and the operating shaft 11 of the rotating body 10 is rotatably supported by the radial bearings 4, 5, and 6. A thrust bearing 7 is disposed at a lower portion of the holding section 2, and a pivot portion 15 provided at a lower end of the operating shaft 11 of the rotating body 10 is supported by the thrust bearing 7.

The input device 1 includes a rotation detection unit 20, a torque-applying unit 30, and a brake-applying unit 40.

In the rotation detection unit 20, the detection plate 12 is located in an internal space of an intermediate housing 21, which forms part of the holding section 2. A rotation detection element 22 facing the detection plate 12 is fixed to the holding section 2 such that a non-contact rotation detection device is formed. The rotation detection element 22 is an optical detector or a magnetic detector. In the case of an optical detector, reflective portions and non-reflective portions are alternately formed on the detection plate 12 in a circumferential direction around the rotation center line O. Alternatively, light transmission portions and light non-transmission portions are alternately formed. In the case of a magnetic detector, the detection plate 12 includes a magnet. In both cases, a rotation angle of the rotating body 10 is detected by the rotation detection unit 20.

In the torque-applying unit 30, an upper support plate 32 and a lower support plate 33 are fixed to an upper housing 31, which forms part of the holding section 2. An upper coil support 34 is fixed to the upper support plate 32, and a lower coil support 35 is fixed to the lower support plate 33. The radial bearing 4 is fixed to the upper coil support 34, and the radial bearing 5 is fixed to the lower coil support 35.

An A-phase torque-applying coil 36A and a B-phase torque-applying coil 36B are fixed to the upper coil support 34 and the lower coil support 35. As also illustrated in FIG. 2, each of the A-phase torque-applying coil 36A and the B-phase torque-applying coil 36B is formed of a conductor that is wound in a rectangular shape around the rotor 13 in a plurality of turns while avoiding making contact with the upper coil support 34 and the lower coil support 35. Control currents having phases differing from each other are respectively supplied to the A-phase torque-applying coil 36A and the B-phase torque-applying coil 36B.

As illustrated in FIG. 3, the rotor (magnet) 13 has a columnar shape, and a magnetized region thereof is divided into two magnetized regions of 180 degrees each. The top surface and the bottom surface of the rotor 13 in a first magnetized region are respectively magnetized to the N pole and the S pole, and the top surface and the bottom surface of the rotor 13 in a second magnetized region are respectively magnetized to the S pole and the N pole. A magnetic flux B generated from the two magnetized regions of the rotor 13 extends across the A-phase torque-applying coil 36A and the B-phase torque-applying coil 36B.

As illustrated in FIG. 1, the brake-applying unit 40 is formed by combining a lower yoke 41 and an upper yoke 42. The lower yoke 41 and the upper yoke 42 are each made of a soft magnetic material, such as a Ni—Fe alloy. A spacer ring 43 formed of a metal plate is mounted on the peripheral portions of the lower yoke 41 and the upper yoke 42. The relative positions of the lower yoke 41 and the upper yoke 42 in the vertical direction in FIG. 1 are defined by the spacer ring 43, and the size of a gap 44 between the lower yoke 41 and the upper yoke 42 in the vertical direction is set to be uniform. The gap 44 is closed by the spacer ring 43 from the outer periphery side. In a state where the relative positions of the lower yoke 41 and the upper yoke 42 are defined by the spacer ring 43, the lower yoke 41 and the upper yoke 42 are fixed to each other by using an exterior case or the like.

When the lower yoke 41 and the upper yoke 42 are combined with each other, the rotary plate 14 included in the rotating body 10 is positioned in the gap 44. In addition, a magneto rheological fluid 45 is supplied between the top surface of the lower yoke 41 and the rotary plate 14 and between the bottom surface of the upper yoke 42 and the rotary plate 14. The magneto rheological fluid 45 is formed by mixing magnetic powder, such as Ni—Fe alloy powder, or magnetic particles into an oil agent, such as silicon oil.

As illustrated in FIG. 1, the radial bearing 6 is fixed to the upper yoke 42, and the thrust bearing 7 is fixed to the lower yoke 41. An 0 ring 46 is interposed between the gap 44 and the radial bearing 6 and between the upper yoke 42 and the operating shaft 11 such that the magneto rheological fluid 45 in the gap 44 is controlled so as not to flow out toward the radial bearing 6.

As illustrated in FIG. 1, a brake-applying coil 47, which is a magnetic-field generating unit, is disposed in the lower yoke 41. The brake-applying coil 47 includes a conductor wound multiple times in the circumferential direction around the rotation center line O.

Figure 4:
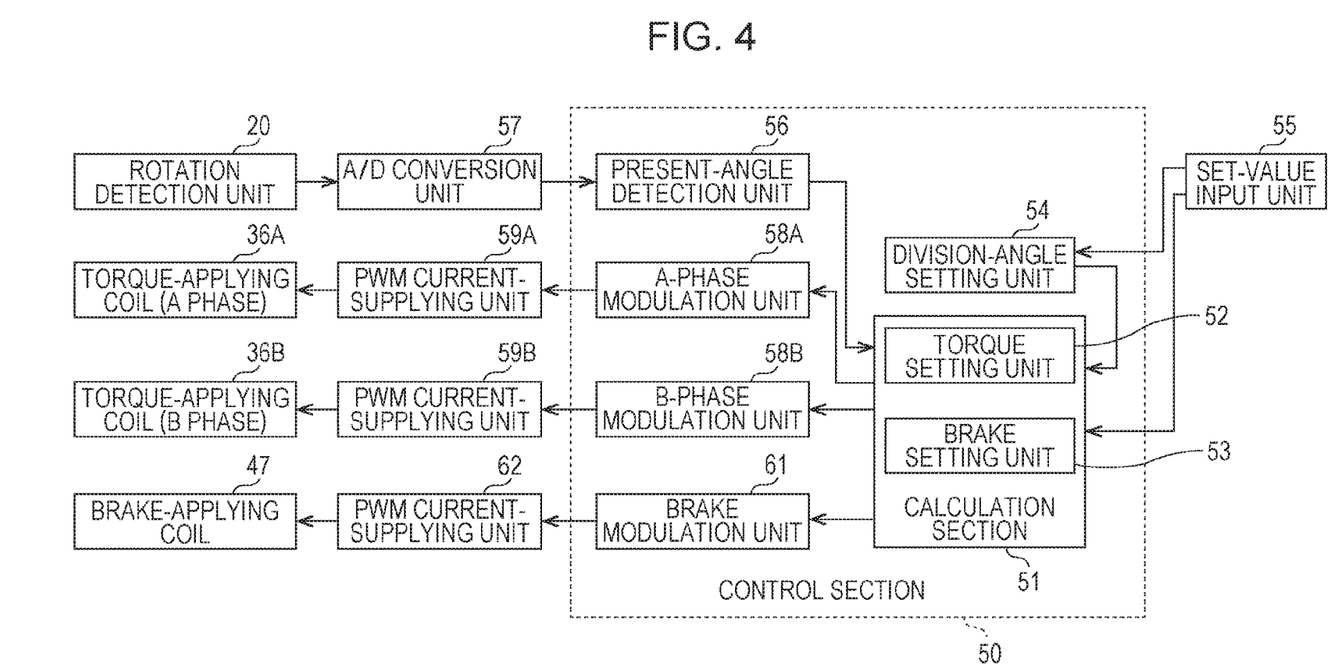
FIG. 4 is a block diagram illustrating the circuit configuration of the input device according to the first embodiment.

FIG. 4 illustrates the circuit configuration of the input device 1 according to the first embodiment.

The input device 1 includes a control unit 50. The control unit 50 includes a CPU and a memory as its main components. In the control unit 50, various processing operations are performed in accordance with programs read from the memory. In FIG. 4, processing units that perform the various processing operations, which are performed in the control unit 50, are illustrated in a block diagram.

The control unit 50 includes a calculation section 51, and the calculation section 51 includes a torque setting unit 52 and a brake setting unit 53. The control unit 50 also includes a division-angle setting unit 54. The input device 1 includes a set-value input unit 55. The set-value input unit 55 includes an input device, such as a keyboard, and a display. By operating the set-value input unit 55, set values are input to the calculation section 51 and the division-angle setting unit 54.

The control unit 50 includes a present-angle detection unit 56. A sensed output from the rotation detection element 22 included in the rotation detection unit 20 is converted into a digital value by an A/D conversion unit 57 and then provided to the present-angle detection unit 56.

The control unit 50 includes an A-phase modulation unit 58A and a B-phase modulation unit 58B. A PWM current-supplying unit 59A is controlled by the A-phase modulation unit 58A in accordance with calculation results obtained by the calculation section 51, and a control current at a duty ratio according to the controlling value is supplied to the A-phase torque-applying coil 36A. Similarly, a PWM current-supplying unit 59B is controlled by the B-phase modulation unit 58B in accordance with calculation results obtained by the calculation section 51, and a control current at a duty ratio according to the controlling value is supplied to the B-phase torque-applying coil 36B.

The control unit 50 includes a brake modulation unit 61. A PWM current-supplying unit 62 is controlled by the brake modulation unit 61 in accordance with calculation results obtained by the calculation section 51, and a control current at a duty ratio according to the controlling value is supplied to the brake-applying coil 47.

Operation of the input device 1 will now be described.

Figure 5A:
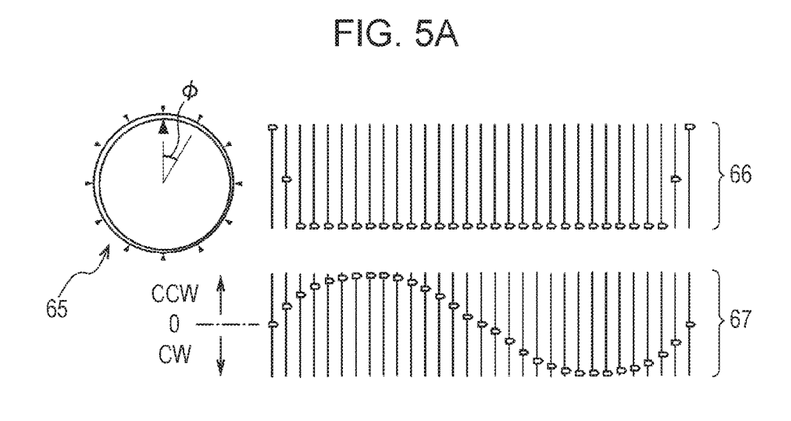
FIG. 5A is a diagram illustrating an operation for setting a braking force and a rotation torque using a set-value input unit illustrated in FIG. 4.

FIG. 5A illustrates an example of an input screen displayed on the display of the set-value input unit 55. An operation for inputting a set-value is performed by using a keyboard device included in the set-value input unit 55 or another input device.

As illustrated in FIG. 5A, a division-angle setting screen 65 is displayed on the display of the set-value input unit 55. As a result of a set value being input to the division-angle setting unit 54 of the control unit 50 by the set-value input unit 55, a division angle $\varphi$, which is one unit of sensation control when rotating the operating shaft 11, is set. The division angle $\varphi$ can be freely set, and in a display example of the division-angle setting screen 65 illustrated in FIG. 5A, one rotation of the rotating body 10 is divided into 12 segments each having an equal angle, which is the division angle $\varphi$, which is 30 degrees. The division number of one rotation can be freely selected and may be, for example, 6 or 24. In addition, a plurality of different division angles $\varphi$ may be set instead of setting equal division angles $\varphi$. Furthermore, the division angle may be only one angle. In other words, the rotating body 10 may be set to rotate only within a range of one division angle.

As illustrated in FIG. 5A, a brake setting screen 66 and a torque setting screen 67 are displayed on the display of the set-value input unit 55. On the brake setting screen 66, the one division angle $\varphi$ ($\varphi$=30 degrees in the example illustrated in FIG. 5A) set by the division-angle setting unit 54 is further subdivided into 31 angles, and the magnitude of a braking force at each of the 31 angle positions can be set to be variable. Similarly, on the torque setting screen 67, the one division angle $\varphi$ ($\varphi$=30 degrees) set by the division-angle setting unit 54 is further subdivided into 31 angles, and the direction and magnitude of a rotation torque at each of the 31 angle positions can be set to be variable.

The setting example in FIG. 5A illustrates variations in the braking force and the rotation torque that are set within one division angle $\varphi$ in the case of performing an operation for rotating the rotating body 10 in a clockwise direction (CW) by hand-holding an operating unit, which is fixed to the operating shaft 11.

On the brake setting screen 66 illustrated in FIG. 5A, the braking force is set to a predetermined magnitude at each of the start point and the end point of one division angle $\varphi$ (30 degrees), and the braking force is set to be approximately zero or extremely small in an intermediate period between the start point and the end point. Set values of the braking force at the angle positions displayed on the brake setting screen 66 are provided to the brake modulation unit 61 from the brake setting unit 53 illustrated in FIG. 4, and the PWM current-supplying unit 62 is controlled by the brake modulation unit 61, so that the duty ratio of pulsed control current to be supplied to the brake-applying coil 47 is set.

As a result, a large current is supplied to the brake-applying coil 47 at the start point and at the end point of the division angle $\varphi$, and the magnetic powder in the magneto rheological fluid 45, with which the gap 44 is filled, is caused to have an aggregation structure or a bridge structure by a brake magnetic field induced by the brake-applying coil 47, which in turn results in an increase in the rotational resistance of the rotating body 10. In the intermediate period between the start point and the end point of the division angle $\varphi$, only a small amount of current is supplied to the brake-applying coil 47, and a brake magnetic field will not be induced. In this period, the viscosity of the magneto rheological fluid 45 will not be increased, and the braking force applied to the rotating body 10 will be small.

On the torque setting screen 67 illustrated in FIG. 5A, the direction and magnitude of the rotation torque is set to vary along a substantial sine curve from the start point to the end point of one division angle φ (30 degrees). The rotation torque applied to the rotating body 10 is approximately zero at the start point and at the end point of the division angle φ. In a period from the start point of the division angle φ to a midpoint of the division angle φ, the rotation torque (resistance torque) in a counterclockwise direction (CCW) is applied to the rotating body 10, and the magnitude of the rotation torque gradually changes. In a period from the midpoint of the division angle φ to the end point of the division angle φ, the rotation torque (pull-in torque) in the clockwise direction (CW) is applied to the rotating body 10, and the magnitude of the rotation torque is set to gradually change.

Figure 5B:
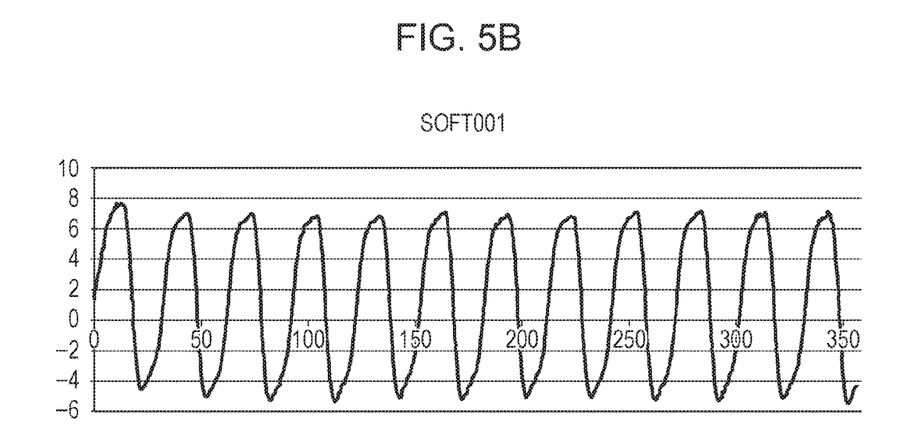
FIG. 5B is a waveform diagram illustrating changes in a feedback force set in FIG. 5A.

When the braking force is set as displayed on the brake setting screen 66 in FIG. 5A, and the rotation torque is set as displayed on the torque setting screen 67, an operation feedback force applied to a hand holding the operating unit so as to rotate the rotating body 10 in the clockwise direction changes as illustrated in FIG. 5B. FIG. 5B illustrates changes in the feedback force applied to a hand during the period when the operating unit is operated with the hand so as to rotate the rotating body 10 in the clockwise direction (CW) by 360 degrees.

When the rotating body 10 is rotated in the clockwise direction, the braking force is applied to the rotating body 10 by the brake-applying unit 40 at the start point of the division angle φ, and accordingly, the rotational resistance increases. When the operating unit is slightly rotated, the braking force is released, and the resistance torque in the counterclockwise direction (CCW) is applied to the rotating body 10 from the start point to the midpoint of the division angle φ. After the midpoint, the pull-in torque in the clockwise direction (CW) is applied to the rotating body 10, and the braking force is applied to the rotating body 10 again at the end point of the division angle φ. Consequently, during the period when the rotating body 10 is being rotated by 360 degrees, the braking force intermittently acts on the rotating body 10 at each division angle φ, and the resistance torque and the pull-in torque act on the rotating body 10 within the division angle φ. As a result, an operation sensation of rotating a rotary switch having a mechanical contact can be experienced.

Figure 6A:
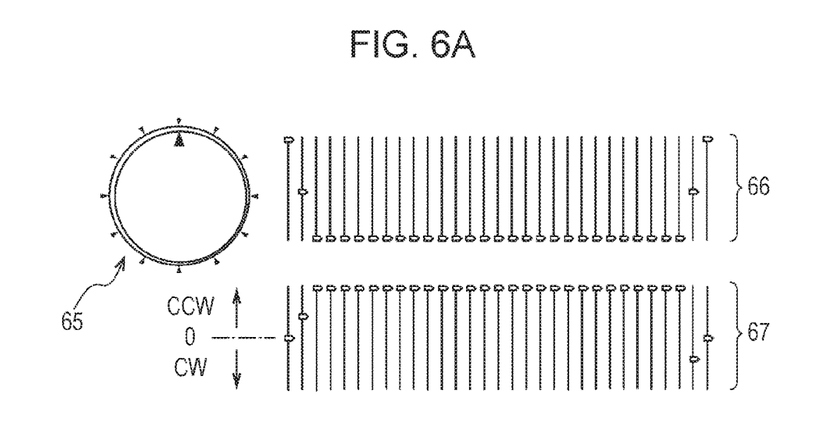
FIG. 6A is another diagram illustrating the operation for setting the braking force and the rotation torque using the set-value input unit illustrated in FIG. 4.
Figure 6B:
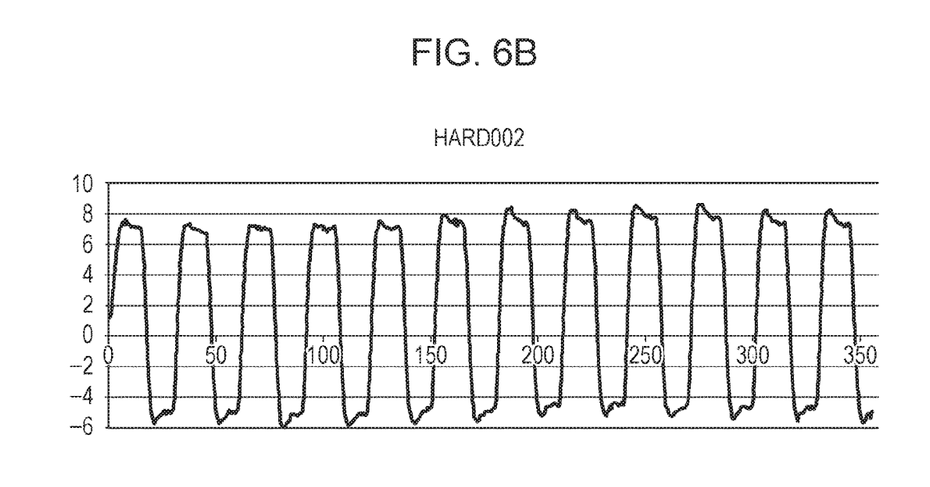
FIG. 6B is a waveform diagram illustrating changes in a feedback force set in FIG. 6A.

FIG. 6A and FIG. 6B illustrate setting examples different from those illustrated in FIG. 5A and FIG. 5B.

In the setting example illustrated in FIG. 6A, the division angle φ of rotation is set to 30 degrees, which is the same as that in the setting in FIG. 5A. Variations in the braking force displayed on the brake setting screen 66 illustrated in FIG. 6A are set in the same manner as in FIG. 5A.

However, the setting of the rotation torque displayed on the torque setting screen 67 illustrated in FIG. 6A is different from that in FIG. 5A. In the setting example in FIG. 6A, the rotation torque is approximately zero at the start point and at the end point of the division angle φ. The magnitude of the rotation torque (resistance torque) in the counterclockwise direction (CCW) is set to be constant from the start point to a midpoint of the division angle φ, and the rotation torque (pull-in torque) in the clockwise direction (CW) is set to be constant from the midpoint to the end point of the division angle φ.

This causes the feedback force applied to a hand when rotating the operating unit in the clockwise direction by 360 degrees to vary as illustrated in FIG. 6B. In FIG. 5B, the magnitudes of the resistance torque and the pull-in torque within the division angle φ are each set to vary along a substantial sine curve, and thus, sensations of resistance and retraction felt by the hand within the division angle φ change in a flexible manner. In contrast, in FIG. 6B, the magnitude of the torque sharply changes when switching from the resistance torque to the pull-in torque within the division angle φ, the sensations of resistance and retraction are provided with a sharp change to the hand rotating the rotating body 10.

Setting of the rotation torque applied to the rotor (magnet) 13 in the torque-applying unit 30 will now be described.

Figure 7A:
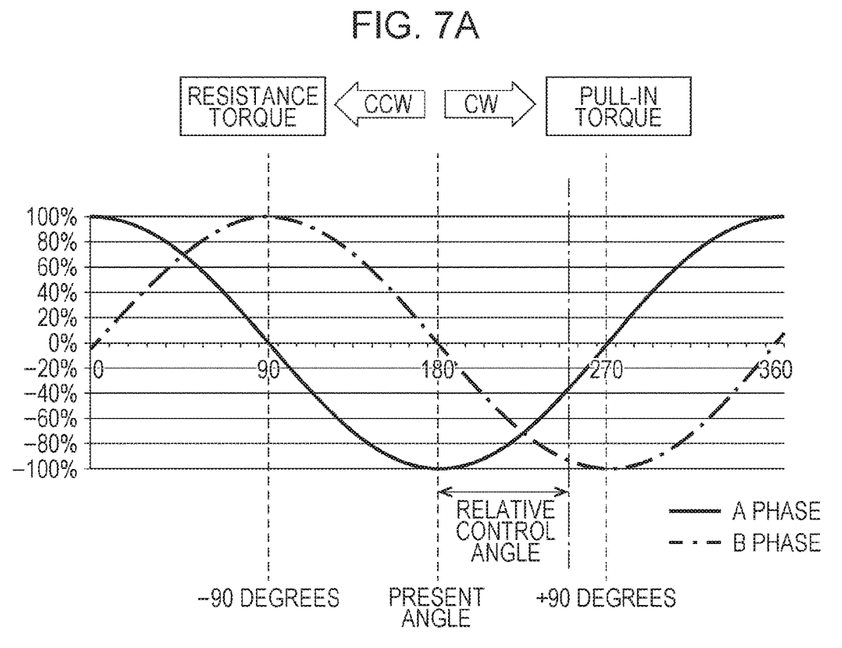
FIGS. 7A and 7B are graphs each illustrating an exemplary setting of the rotation torque in the input device according to the first embodiment.

In FIG. 7A, the vertical axis denotes variations in current supplied to the A-phase torque-applying coil 36A and current supplied to the B-phase torque-applying coil 36B. As illustrated in FIG. 4, although a pulsed current whose duty ratio has been modulated by the PWM current-supplying unit 59A and a pulsed current whose duty ratio has been modulated by the PWM current-supplying unit 59B are respectively supplied to the torque-applying coils 36A and 36B, the integrated values of the pulsed currents are illustrated in FIG. 7A for convenience of description. In other words, FIG. 7A illustrates a scenario in which direct current is supplied to each of the torque-applying coils 36A and 36B.

In FIG. 7A, when it is assumed that the horizontal axis denotes time, by supplying currents having phases differing from each other by 90 degrees to the two torque-applying coils 36A and 36B in accordance with time, a force that causes the rotor (magnet) 13 to rotate can be applied to the rotor (magnet) 13. However, the torque-applying unit 30 is provided in order not to rotate the rotor 13 but to apply the resistance torque and the pull-in torque to the rotating body 10 when the rotating body 10 is rotated by hand.

Accordingly, in FIG. 7A, the horizontal axis denotes the rotation angle of the rotor 13. When the rotor 13 moves to any angle on the horizontal axis of FIG. 7A corresponding to the present angle, the rotor 13 can be stopped at the present angle by continuing to supply the current having a fixed value corresponding to the present angle as denoted by the vertical axis to the torque-applying coil 36A and the other current having a fixed value corresponding to the present angle as denoted by the vertical axis to the torque-applying coil 36B. For example, in the case where the present angle of the rotor 13 is 45 degrees, the rotor 13 can be stopped at the present angle, which is 45 degrees, by continuing to supply approximately 70% of the current to the A-phase torque-applying coil 36A and approximately 70% of the other current to the B-phase torque-applying coil 36B.

As indicated by one of the dashed lines extending vertically in FIG. 7A, in the case where a position at which the rotor 13 has rotated by 180 degrees is the present angle, the rotor 13 can be stopped at the position of the present angle, which is 180 degrees, by continuing to supply −100% of the current to the A-phase torque-applying coil 36A and by setting the other current supplied to the B-phase torque-applying coil 36B to be zero. In this case, the rotation torque acting on the rotor 13 is zero.

Accordingly, a relative control angle is set on the positive side or the negative side of the present angle on the basis of the waveforms illustrated in FIG. 7A, and when the rotor 13 is positioned at the present angle, control current corresponding to the relative control angle is supplied to the torque-applying coils 36A and 36B, so that the rotation torque can be applied to the rotor 13 positioned at the present angle.

For example, in the case where the present angle of the rotor 13 is 180 degrees, the relative control angle is set to be 90 degrees larger than 180 degrees, and the current and the other current that are indicated by another dashed line at the position of "+90 degrees" in FIG. 7A are respectively supplied to the torque-applying coils 36A and 36B. In other words, the current supplied to the A-phase torque-applying coil 36A is set to be zero, and the other current supplied to the B-phase torque-applying coil 36B is set to be −100%. As a result, the maximum value of the pull-in torque in the clockwise direction (CW) can be applied to the rotor 13 at the position of the present angle of 180 degrees.

In the case where the present angle of the rotor 13 is 180 degrees, the relative control angle is set to be 90 degrees smaller than 180 degrees, and the current and the other current that are indicated by another dashed line at the position of "−90 degrees" in FIG. 7A are respectively supplied to the torque-applying coils 36A and 36B. In other words, the current supplied to the A-phase torque-applying coil 36A is set to be zero, and the other current supplied to the B-phase torque-applying coil 36B is set to be +100%, and as a result, the maximum value of the resistance torque in the counterclockwise direction (CCW) can be applied to the rotor 13 at the position of the present angle of 180 degrees.

The above setting can be applied when the present angle of the rotor 13 is any angle, and regardless of the actual angle of the rotor 13, the pull-in torque, which is the rotation torque in the clockwise direction (CW), can be set to be the maximum value (100%) by setting the relative control angle to be 90 degrees larger than the present angle of the rotor 13, which functions as a reference, and supplying the current and the other current that correspond to the relative control angle, which is 90 degrees larger than the present angle, to the torque-applying coils 36A and 36B, respectively. In addition, the resistance torque, which is the rotation torque in the counterclockwise direction (CCW), can be set to be the maximum value (100%) by setting the relative control angle to be 90 degrees smaller than the present angle and supplying the current and the other current that correspond to the relative control angle, which is 90 degrees smaller than the present angle, to the torque-applying coils 36A and 36B, respectively.

The setting example of the rotation torque displayed on the torque setting screen 67 illustrated in FIG. 6A, the resistance torque is maintained at 100% in the first half of the division angle φ. This implies that the relative control angle is set to be 90 degrees smaller than the present angle of the rotor 13 regardless of the actual angle of the rotor 13. In addition, the pull-in torque is maintained at 100% in the latter half of the division angle φ, and this implies that the relative control angle is set to be 90 degrees larger than the present angle of the rotor 13 regardless of the actual angle of the rotor 13.

In the torque setting screen 67 illustrated in FIG. 5A, each of the magnitudes of the resistance torque, which is the rotation torque in the counterclockwise direction (CCW), and the pull-in torque, which is the rotation torque in the clockwise direction (CW), at the 31 divided angles within the division angle φ gradually varies along a substantial sine curve. In order to change the magnitude of the rotation torque at each angle in this manner, the following arithmetic processing operations are performed in the torque setting unit 52.

In a first arithmetic processing operation, in the torque setting unit 52 illustrated in FIG. 4, set values of the pull-in torque that varies from moment to moment as displayed on the torque setting screen 67 in FIG. 5A are determined by multiplying the maximum value (100%) of the pull-in torque in the case where the relative control angle is set to be 90 degrees larger than the present angle of the rotor 13 by predetermined coefficients. In addition, set values of the resistance torque that varies from moment to moment as displayed on the torque setting screen 67 in FIG. 5A are determined by multiplying the maximum value (100%) of the resistance torque in the case where the relative control angle is set to be 90 degrees smaller than the present angle by predetermined coefficients.

Figure 7B:
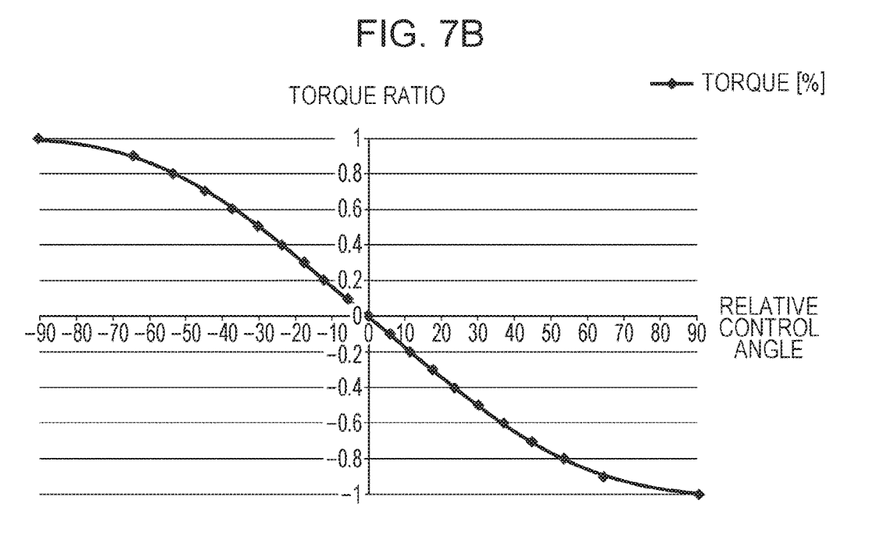

In a second arithmetic processing operation, the torque variation table illustrated in FIG. 7B is used. In FIG. 7B, the horizontal axis and the vertical axis denote the relative control angle and torque ratio, respectively. The torque ratio is expressed as the ratio of the rotation torque when the maximum value of the rotation torque in the case where the relative control angle is set in a range of ±90 degrees is "1". After the values of the rotation torque to be set for the corresponding angles have been determined, the rotation torque can be set by selecting the relative control angle that corresponds to the magnitude of the rotation torque by using the table illustrated in FIG. 7B, and by supplying the current and the other current that correspond to the relative control angle to the torque-applying coils 36A and 36B, respectively.

Figure 8:
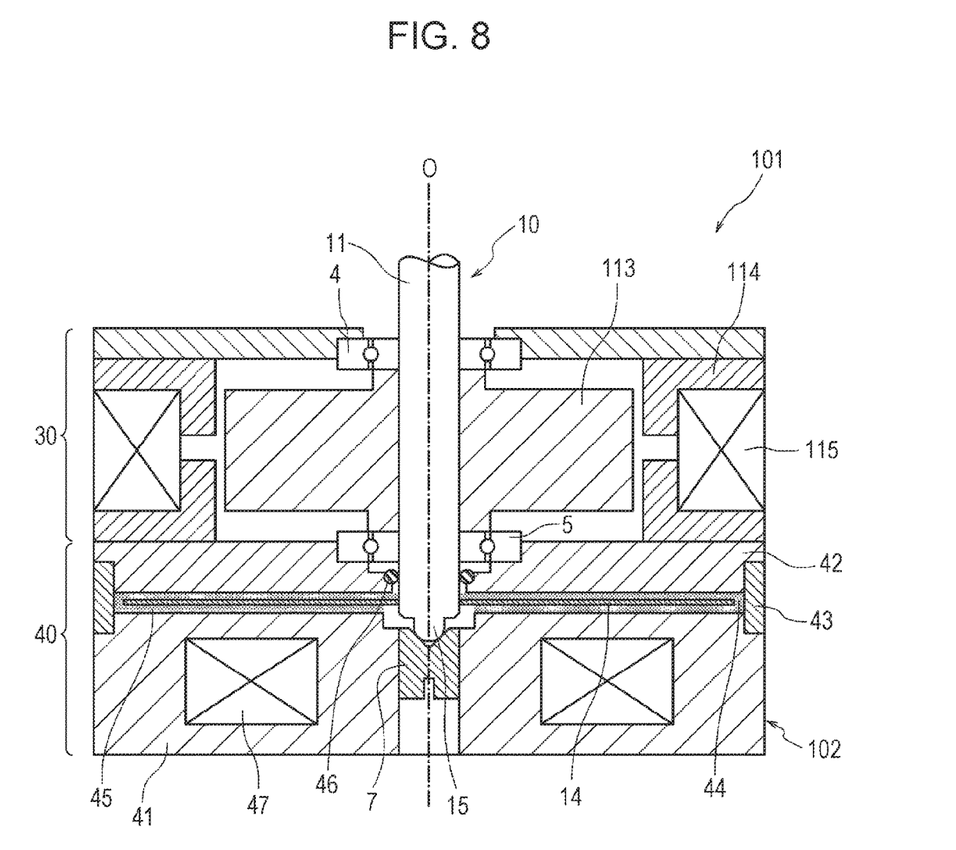
FIG. 8 is a sectional view illustrating the overall structure of an input device according to a second embodiment of the present invention.
Figure 9:
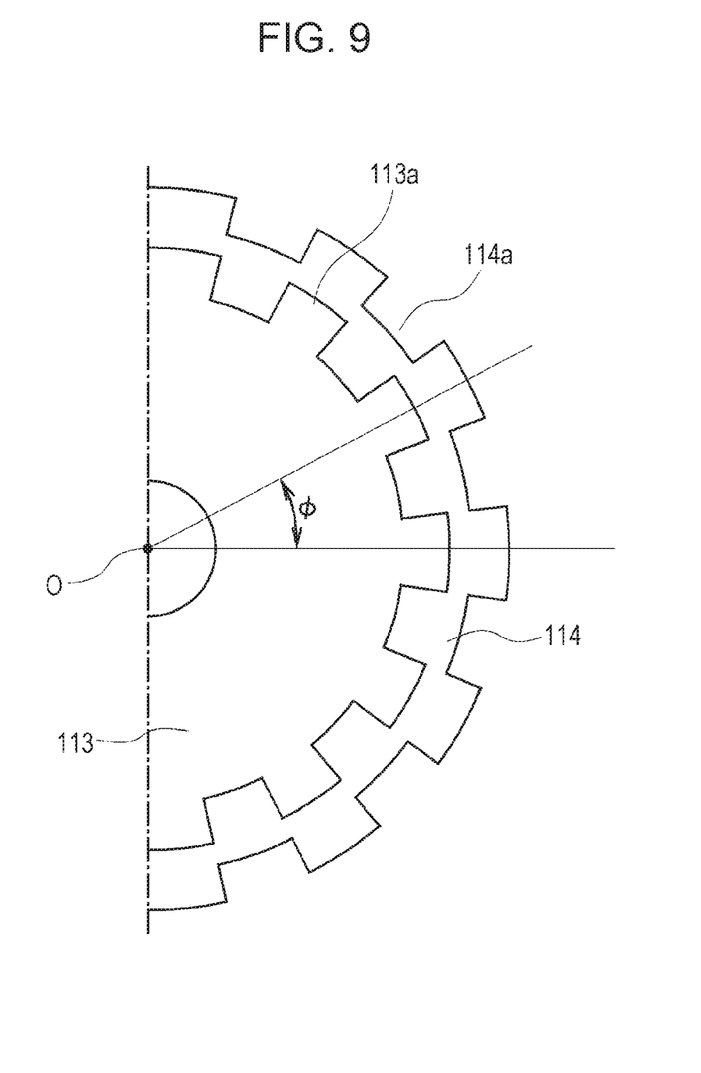
FIG. 9 is a partial plan view illustrating a portion of a rotating body of the input device illustrated in FIG. 8.

An input device 101 according to a second embodiment of the present invention is illustrated in FIG. 8 and FIG. 9. In the second embodiment, components that provide functions the same as those in the first embodiment are denoted by the same reference numerals, and detailed descriptions thereof will be omitted.

In the input device 101 illustrated in FIG. 8, the rotating body 10 is rotatably supported on a holding section 102. The rotating body 10 includes the operating shaft 11, the rotary plate 14 fixed to the operating shaft 11, which is the rotating body 10, and a rotor 113 fixed to the operating shaft 11, which is the rotating body 10.

The input device 101 includes the torque-applying unit 30 and the brake-applying unit 40. Note that the rotation detection unit 20 is not illustrated in FIG. 8. The structure of the brake-applying unit 40 is the same as that in the input device 1 illustrated in FIG. 1, and the rotary plate 14 and the magneto rheological fluid 45 are provided in the gap 44 between the lower yoke 41 and the upper yoke 42. In addition, the brake-applying coil 47 is disposed in the lower yoke 41.

In the torque-applying unit 30, the rotor 113 is fixed to the operating shaft 11, which is the rotating body 10. As illustrated in FIG. 9, facing portions 113a are formed at equal angular intervals, that is, on a per equal division angle φ basis, in the circumferential direction so as to project from the outer peripheral surface of the rotor 113. Although the rotor 113 is made of a magnetic material, the rotor 113 is not a magnet. The holding section 102 includes a holding yoke 114. Facing portions 114a are formed at equal angular intervals, that is, on a per equal division angle φ basis, in the circumferential direction so as to project from the inner peripheral portion of the holding yoke 114. Each of the facing portions 113a of the rotor 113 and a corresponding one of the facing portions 114a of the holding yoke 114 are formed at the same division angle φ.

The holding yoke 114 is made of a magnetic material, and a torque-applying coil 115 is held by the holding yoke 114.

Operation of the input device 101 according to the second embodiment will now be described.

Figure 10A:
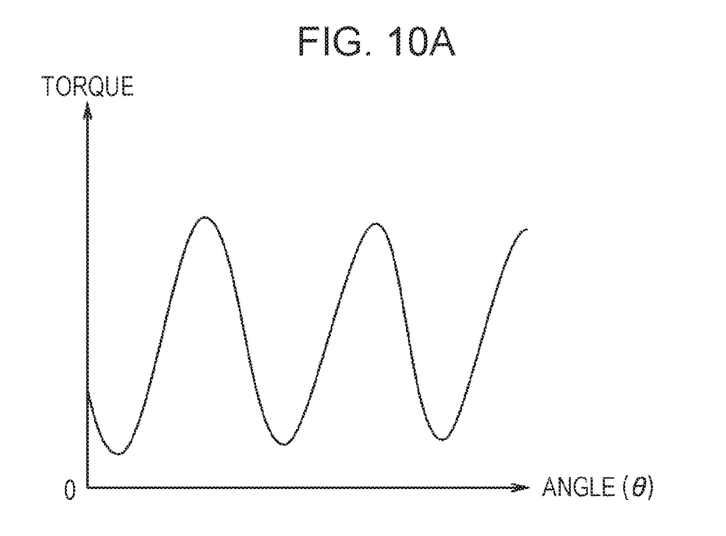
FIGS. 10A and 10B are graphs each illustrating an exemplary setting of a rotation torque in the input device according to the second embodiment.

In FIG. 10A, the horizontal axis denotes the rotation angle of the rotating body 10, and the vertical axis denotes variations in the braking force (brake torque) applied to the rotary plate 14 when the current supplied to the brake-applying coil 47 of the brake-applying unit 40 is controlled. By controlling only the brake-applying unit 40, although a hand rotating the operating member can experience variations in sensation of resistance as a result of varying the brake force (brake torque), the rotation torque cannot be applied to the rotating body 10.

Figure 10B:
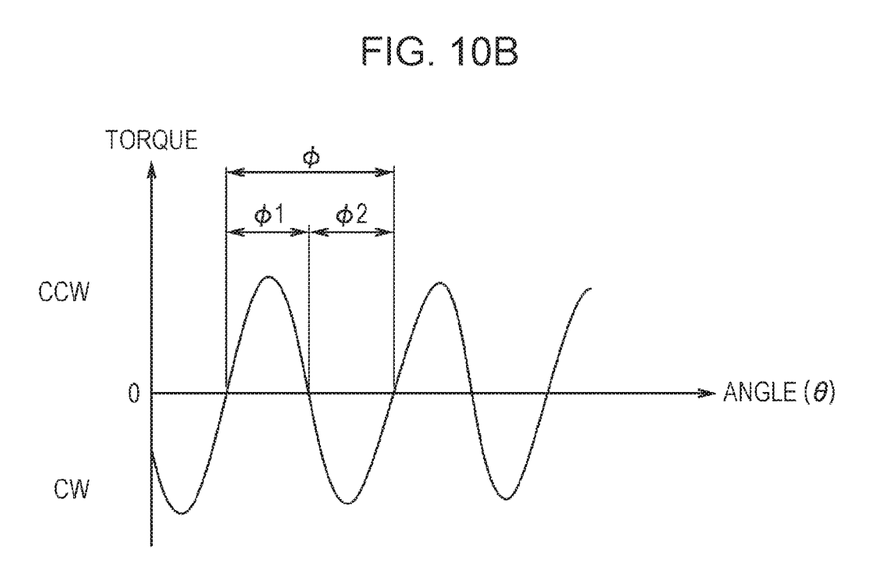

When current is supplied to the torque-applying coil 115 included in the torque-applying unit 30, the holding yoke 114 is magnetized. When the facing portions 113a of the rotor 113 and the facing portions 114a of the holding yoke 114, which are illustrated in FIG. 9, face one another, the rotor 113 is stable. However, when the rotating body 10 is rotated in the clockwise direction from the position at which the rotor 113 is stable, as illustrated in FIG. 10B, a resistance torque in a direction opposite to the direction in which the operating member is rotated is generated in the first half φ1 of the division angle φ, and a pull-in torque in the rotation direction is generated in the latter half φ2 of the division angle φ.

Thus, by controlling supply of current to the torque-applying coil 115 and supply of current to the brake-applying coil 47, a hand trying to rotate the operating member can feel the resistance torque and the pull-in torque as well as an appropriate sensation of brake resistance. By combining setting of the rotation torque performed by the torque-applying unit 30 and setting of the braking force performed by the brake-applying unit 40, sensations of various operations can be experienced, and undesirable vibration of the rotating body 10 can be suppressed. In addition, in a stable state in which the facing portions 113a and the facing portions 114a face one another, supply of the current to the torque-applying coil 115 can be stopped as a result of the braking force being applied to the rotating body 10 by the brake-applying unit 40, and consequently, a reduction in power consumption can be achieved.

Note that, in the above-described embodiments, the torque-applying coils 36A, 36B, and 115 are each disposed in the corresponding holding section in the torque-applying unit, and the rotating body 10 includes a magnet in the first embodiment. However, conversely, a rotating body may include a torque-applying coil, and a holding section may include a magnet or the like.

What is claimed is:

1. An input device comprising:
   a holding section;
   a rotating body rotatably supported on the holding section so as to be operated by an operator;
   a rotation detection unit configured to detect rotation of the rotating body;
   a brake-applying unit configured to apply a braking force to the rotating body, the brake-applying unit including:
   a disk-shaped rotary plate coupled with the rotating body;
   a magneto rheological fluid provided in a gap provided between the holding section and the disk-shaped rotary plate; and
   a brake-applying coil configured to provide a magnetic field to the magneto rheological fluid;
   a torque-applying unit including at least two torque-applying coils configured to apply a rotation torque to the rotating body; and
   a control circuit configured to divide one rotation of the rotating body into a plurality of angle sections each having a division angle, to control a first current supplied to the brake-applying coil and to control at least two second currents supplied to the at least two torque-applying coils such that a resistance torque and a pull-in torque are provided to the rotating body in each angle section, thereby providing an operating sensation to the operator, wherein the resistance torque is in a direction opposite to a direction of a force causing the rotating body to rotate, thereby applying the braking force at a boundary between the angle sections, and the pull-in torque is in the direction of the force causing the rotating body to rotate in each angle section.

2. The input device according to claim 1, wherein the control circuit is capable of changing a magnitude of the resistance torque and a magnitude of the pull-in torque at each rotation angle of the rotating body.

3. The input device according to claim 1,
   wherein the torque-applying unit includes a yoke facing the rotating body, the yoke having a plurality of first protrusions arranged in a rotation direction of the rotating body with a first predetermined space provided between adjacent first protrusions,
   wherein the rotating body includes a plurality of second protrusions facing the yoke and arranged in the rotation direction of the rotating body with a second predetermined space provided between adjacent second protrusions such that each of the second protrusions corresponding to respective one of the first protrusions, and
   wherein the torque-applying coils is configured to magnetize one of the yoke and the rotating body.

4. The input device according to claim 1, wherein the control circuit is further configured to stop supplying the at least two second currents to the torque-applying coils when the braking force is applied to the rotary plate at the boundary between the angle sections.

5. An input device comprising:
   a holding section;
   a rotating body rotatably supported on the holding section;
   a rotation detection unit configured to detect rotation of the rotating body;
   a brake-applying unit configured to apply a braking force to the rotating body, the brake-applying unit including:
   a rotary plate coupled with the rotating body;
   a magneto rheological fluid provided in a gap provided between the holding section and the rotary plate; and
   a brake-applying coil configured to provide a magnetic field to the magneto rheological fluid;
   a torque-applying unit including at least two torque-applying coils configured to apply a rotation torque to the rotating body; and
   a control circuit configured to control a first current supplied to the brake-applying coil and to control at least two second currents supplied to the at least two torque-applying coils,
   wherein the control circuit includes:
   a division-angle setting circuit configured to divide one rotation of the rotating body into a plurality of angle sections each having a division angle;
   a torque setting circuit configured to set, by controlling the at least two second currents supplied to the torque-applying coils, the rotation torque applied to the rotating body in each angle section; and a brake setting circuit configured to apply, by controlling the first current supplied to the brake-applying coil, the braking force to the rotary plate at a boundary between the angle sections.

6. The input device according to claim 5, wherein one of the rotating body and the holding section includes a magnet, and the at least two torque-applying coils are mounted on the other of the rotating body and the holding section, wherein the at least two second currents have respective phases differing from each other, and wherein the rotation torque is applied to the rotating body by a magnetic field induced by the torque-applying coils.

7. The input device according to claim 5, wherein, as a result of controlling the at least two second currents, the torque-applying coils provide a resistance torque in a direction opposite to a direction of a force causing the rotating body to rotate, and a pull-in torque in the direction of the force causing the rotating body to rotate in each angle section.

8. The input device according to claim 7, wherein the control circuit is capable of changing a magnitude of the resistance torque and a magnitude of the pull-in torque at each rotation angle of the rotating body.

9. The input device according to claim 5, wherein the division-angle setting circuit is capable of changing a number of angle sections into which one rotation of the rotating body is divided.

10. The input device according to claim 5, wherein the division angles of the angle sections are set to be a fixed angle.

11. The input device according to claim 10, wherein the torque-applying unit includes a yoke facing the rotating body, the yoke having a plurality of first protrusions arranged in a rotation direction of the rotating body with a first predetermined space provided between adjacent first protrusions, wherein the rotating body includes a plurality of second protrusions facing the yoke and arranged in the rotation direction of the rotating body with a second predetermined space provided between adjacent second protrusions such that each of the second protrusions corresponding to respective one of the first protrusions, and wherein the torque-applying coils is configured to magnetize one of the yoke and the rotating body.

12. The input device according to claim 5, wherein the torque-setting circuit is configured to stop supplying the at least two second currents to the torque-applying coils when the braking force is applied to the rotary plate at the boundary between the angle sections.

* * * * *